United States Patent [19]

La Conte

[11] 4,383,392
[45] May 17, 1983

[54] DUAL-CAM GUIDED FOUR-BAR LINKAGE MECHANISM FOR AN OVERHEAD BAGGAGE COMPARTMENT

[75] Inventor: Richard J. La Conte, Auburn, Wash.

[73] Assignee: The Boeing Company, Seattle, Wash.

[21] Appl. No.: 217,939

[22] Filed: Dec. 18, 1980

[51] Int. Cl.³ .......................... E05D 15/40; E05F 1/00
[52] U.S. Cl. ........................................ 49/205; 49/206; 49/248; 49/379
[58] Field of Search ................. 49/246, 248, 249, 253, 49/205, 206, 379; 220/331, 333

[56] References Cited

U.S. PATENT DOCUMENTS

| | | | |
|---|---|---|---|
| 3,333,362 | 8/1967 | Kostin et al. | 49/248 |
| 3,444,648 | 5/1969 | Anderson et al. | 49/248 |
| 3,773,311 | 11/1973 | Poe et al. | 49/205 X |
| 3,849,937 | 11/1974 | Blumenthal | 49/206 X |
| 4,185,415 | 1/1980 | LaConte | 49/248 |

Primary Examiner—Philip C. Kannan
Attorney, Agent, or Firm—H. Gus Hartmann; Bernard A. Donahue; Nicolaas DeVogel

[57] ABSTRACT

A hinge mechanism for an overhead baggage compartment which is generally located in the passenger section of an airliner. The hinge mechanism comprises, a dual-cam guided four-bar linkage mechanism which produces a compound motion to the door for retraction through a relatively narrow horizontal opening into an area above the baggage compartment. Ordinarily, a four-bar linkage mechanism would have its operation designed around two fixed pivot points; however, in this disclosure there is only one fixed pivot point and the other of said pivots is a walking pivot which is guided by a dual-cam device for profiling the travel of the door.

4 Claims, 7 Drawing Figures

DUAL-CAM GUIDED FOUR-BAR LINKAGE MECHANISM FOR AN OVERHEAD BAGGAGE COMPARTMENT

SUMMARY OF THE INVENTION

The invention relates to a retraction or extension mechanism for the door of an overhead stowage compartment for carry-on luggage in the passenger section of an airliner; and more particularly to a door hinge system which relies upon the interaction of a dual-cam and four-bar linkage mechanism that functions in a combined manner to rotate the door from a closed position through approximately ninety degrees to an open position while moving the door edge-wise through a narrow horizontal slot opening into an area above and clear of the stowage compartment.

Prior known overhead stowage compartments, in airplanes, have two doors which open up to a single width compartment of approximately ninety inches and without any fixed partition between the two doors. However, each door has a pair of single pivot point hinges for operating support and these hinges protrude into the stowage compartment. The disadvantage of this arrangement is that the protrusion, particularly of the central hinges, limits the height of the stowage opening in the vicinity of the hinges and in some instances articles have wedged between the hinge links and jammed the door in the closed position.

Therefore, an object of the present invention is to provide a door hinge system that does not protrude into the stowage compartment to limit the height of the stowage access opening and restrict the size of luggage that can be stowed. This permits any object that will fit through the vertical height opening, to be placed into the stowage compartment.

Another object is to prevent objects within the stowage compartment from interfering with the operation of the door hinge system.

Another object is to retract the door through a narrow horizontal slot opening above the stowage compartment such that the passenger standing room area is clear of any door obstruction.

Another object is to provide the more natural feel of a single pivot type of door hinge for passengers operating the stowage compartment door, even though the actual hinge comprises a four-bar linkage having a walking pivot guided by a dual-camtrack and follower mechanism.

DETAILED DESCRIPTION OF THE DRAWINGS

Figure 1:
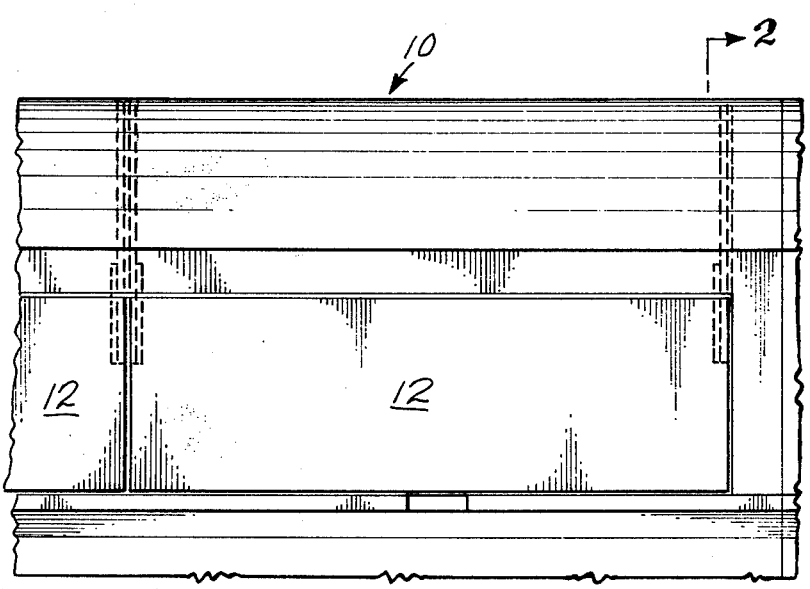
FIG. 1 is a front view of a portion of an overhead baggage compartment for the stowage of carry-on luggage by passengers.

FIG. 1 is a partial front view of an overhead bin 10 having a compartment 11 for stowage of carry-on luggage by passengers on an airliner. The stowage compartment 11 is approximately ninety inches in length and has two doors 12 which open up to expose a single width opening into the interior volume 11 which is void of any fixed partitions or hinge obstructions throughout its interior length, so that anything that can be inserted with the door 12 in the open position, can be stowed. Because of the length of the compartment 11, it is preferable to use double doors.

Figure 2:
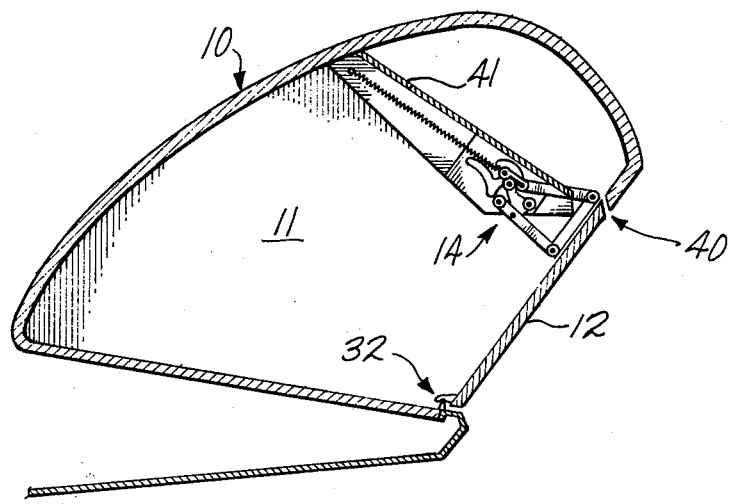
FIG. 2 is a cross-sectional side view of the baggage compartment shown in FIG. 1 taken as indicated by the line 2—2.

FIG. 2 is a cross-sectional side view taken in the direction indicated by line 2—2 of FIG. 1 and shows the hinge arrangement 14 of the invention, with the door 12 at a fully closed and latched position.

Figure 3:
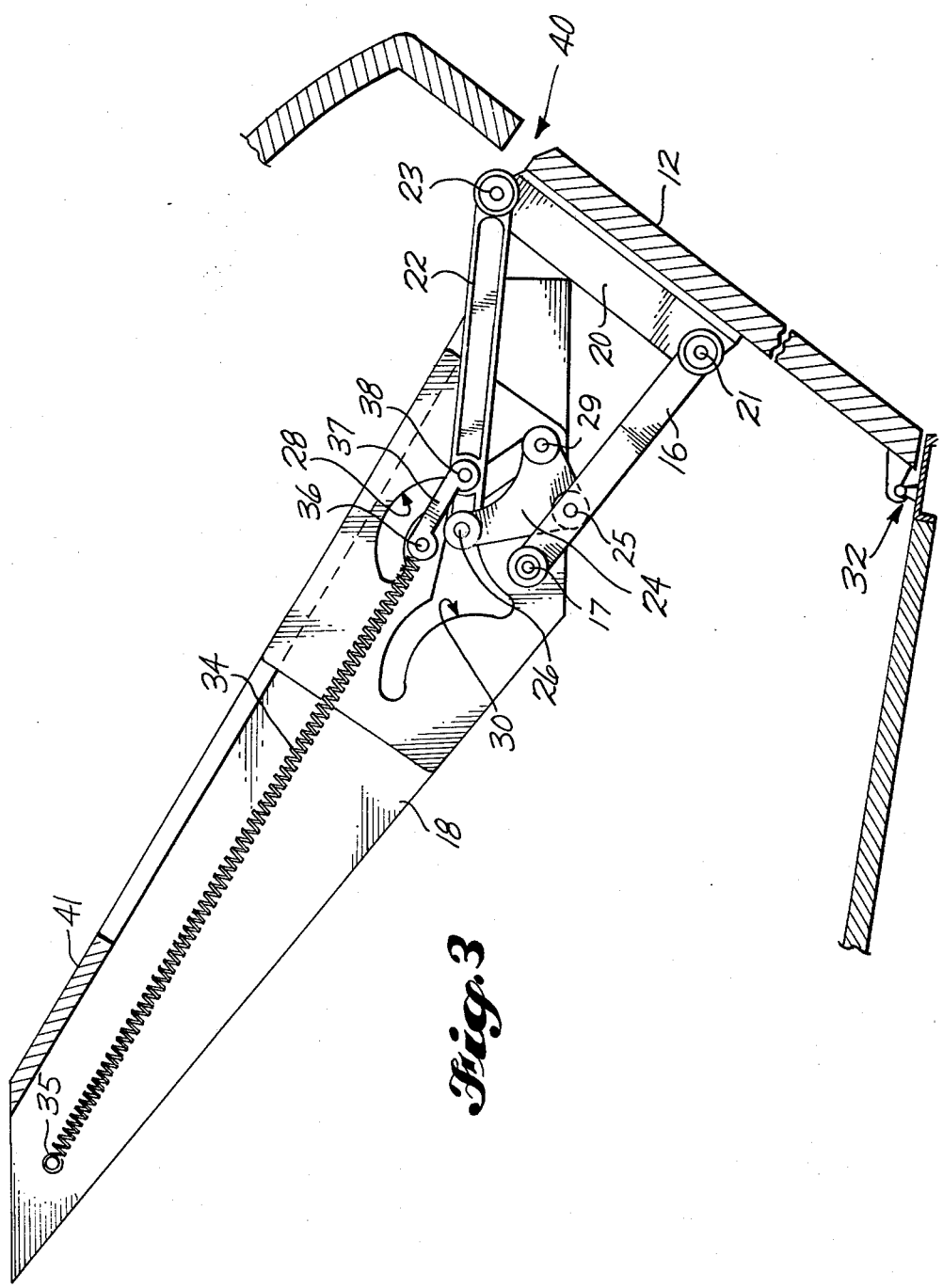
FIG. 3 is an enlarged cross-sectional side view of the baggage compartment door hinging mechanism, similar to FIG. 2, and shows the door in the closed position.
Figure 4:
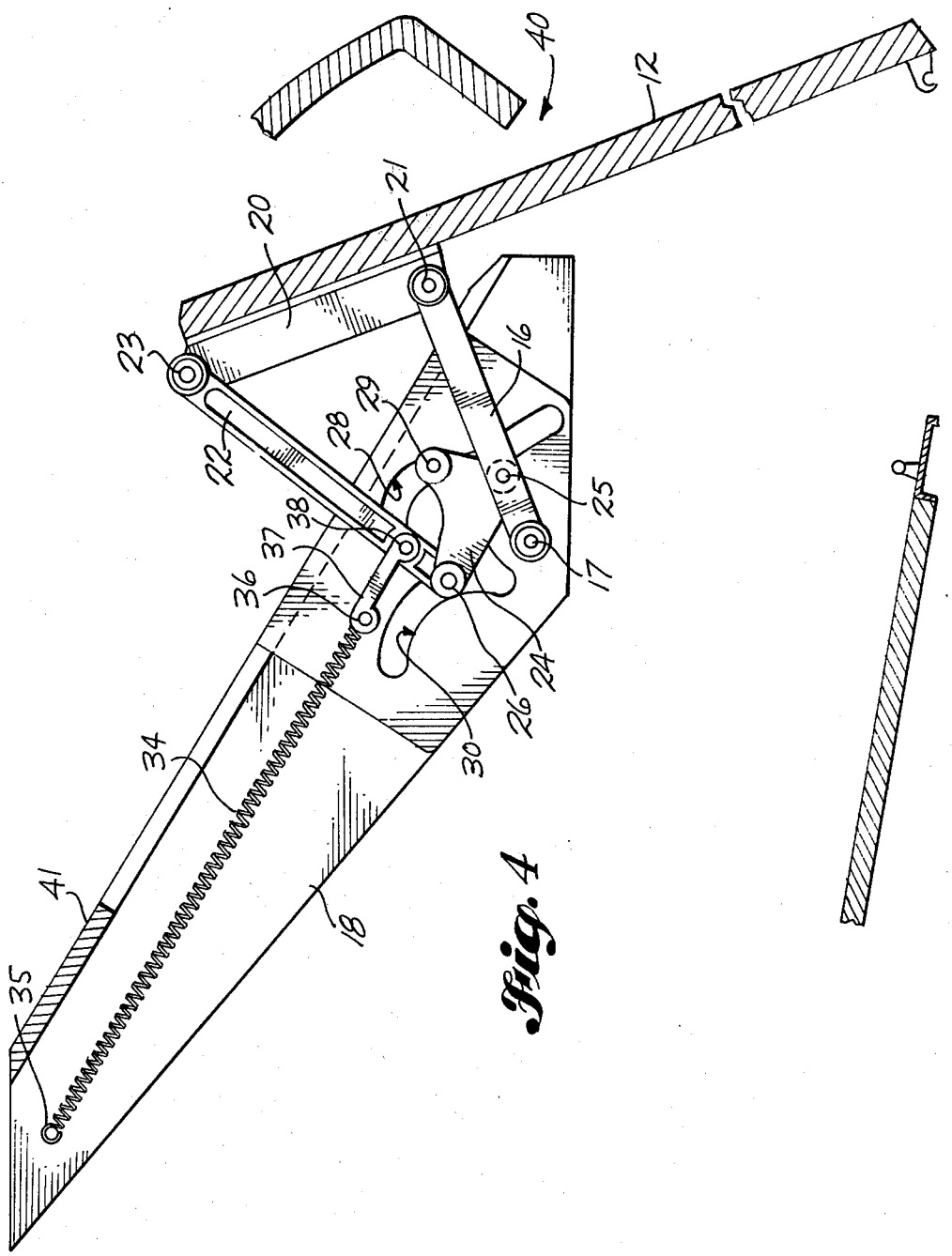
FIG. 4 is a view similar to FIG. 3 with the door at an intermediate position and partially retracted into a narrow horizontal slot opening above the baggage compartment.
Figure 5:
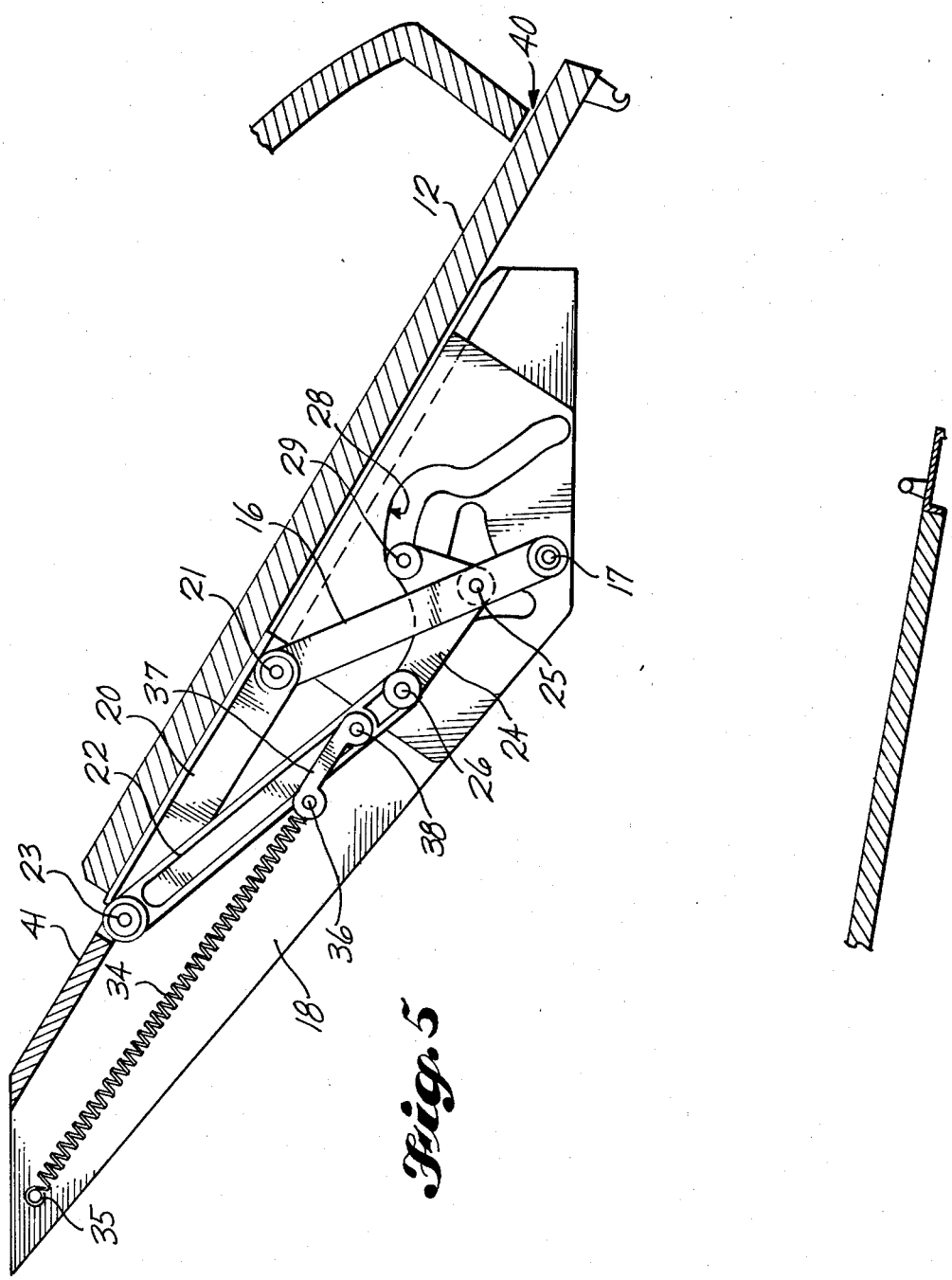
FIG. 5 is a view similar to FIG. 3 with the door at a fully retracted position and substantially clear of the standing room area for passengers; and this open position of the door provides a complete face opening into the stowage compartment.

FIGS. 3, 4 and 5 are enlarged cross-sectional side views of the hinge arrangement 14 of the invention, similar to FIG. 2, and more clearly depict the hinge mechanism with the door 12 at three positions, i.e.: FIG. 3, a fully closed and latched position; FIG. 4, an intermediate position; and FIG. 5, a fully retracted and open position.

Referring to FIGS. 2-5, the stowage compartment door hinge system 14 comprises, a four-bar linkage that is guided throughout its operating cycle by a dual-cam and bellcrank mechanism.

The four-bar linkage comprises: a first link 16 pivotally mounted at one end 17 to fixed support structure 18; a second link 20 forming a bracket which is fixed to the door 12 and is pivotally connected at its lower end 21 to the other end of the first link 16; a third link 22 pivotally connected at one end 23 to the upper end of the second link 20; and a fourth link formed by a bellcrank 24 which is pivotally mounted at 25 to an intermediate position on the first link 16 and one arm of bellcrank 24 is pivotally connected to the other end 26 of third link 22. The bellcrank 24 provides movement or walking means to the pivot connection 26 through a dual-camtrack, which is more clearly shown in the enlarged detail view of FIG. 6, and roller follower mechanism which comprises: an upper S-camtrack 28 engaged by a cam follower bearing axially aligned, on bellcrank 24, with pivot 29; and a lower V-camtrack 30 engaged by cam follower bearing axially aligned, on bellcrank 24, with pivot 26. The cam followers at pivots 26 and 29 are preferably of the roller bearing type which is commonly used in high performance cam mechanisms.

A typical four-bar linkage mechanism would have links 16 and 22 as primary links and these links would have fixed pivots at both 17 and 26 respectively. However, in the present invention one of these primary links, namely 22, has a walking pivot point at 26 which is guided by a bellcrank 24 and dual-camtrack 28 and 30 arrangement.

In operation, the door 12 is held in the closed position shown in FIG. 3 by a latch 32 at the bottom of the door; and when the latch 32 is released, an energizing device, such as a spring 34 having one end 35 fixed to support structure 18 and the other end 36 connected to a link 37 which is pivotally connected at 38 to an intermediate position on link 22, actuates the door. By holding one end of link 16 on the fixed pivot 17 and then drawing one end of link 22 at the pivot 26 with bellcrank 24 through the dual-camtracks 28 and 30, the travel of the door 12 is profiled to squeeze through a narrow horizontal slot 40, approximately two inches in height, above the stowage compartment 11. The door 12 is retracted through this minimum aperture 40 and onto a shelf 41 over the top of the stowage compartment 11. The shelf 41 runs the entire length of the compartment and protects the doors 12 when they are in the retracted position shown in FIG. 5.

Figure 6:
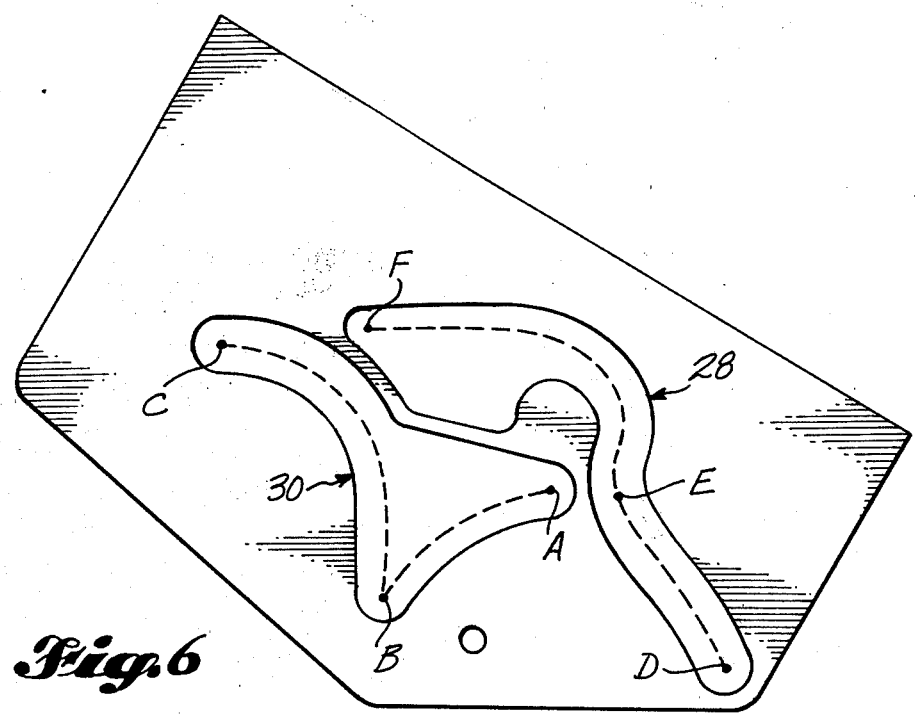
FIG. 6 is an enlarged detail view of the dual-cam-tracks shown in FIGS. 3-5.

FIG. 6 is an enlarged detail view of the dual-camtracks 28 and 30, shown in FIGS. 3-5, which are machined profile surfaces designed to be traversed by the cam followers connected to the bellcrank 24 at pivots 29 and 26 respectively. Initial opening of the door 12 results in: the cam follower at pivot 26 engaged in the V-camtrack 30 to travel along a first arc track from point A to point B; the cam follower pivot 29 engaged in the S-camtrack 28 to travel along a first track from point D to point E; and the door 12 to be rotated through approximately forty-five degrees from the closed position. Further opening of the door 12 results in: the cam follower 26 in V-camtrack 30 to travel along a second arc track from point B to point C; the cam follower 29 in S-camtrack 28 to travel from point E to point F; and the door motion is a combination of rotation through approximately another forty-five degrees and lateral translation or edge-wise movement through the narrow horizontal slot 40 above the stowage compartment 11 to a retracted position.

Figure 7:
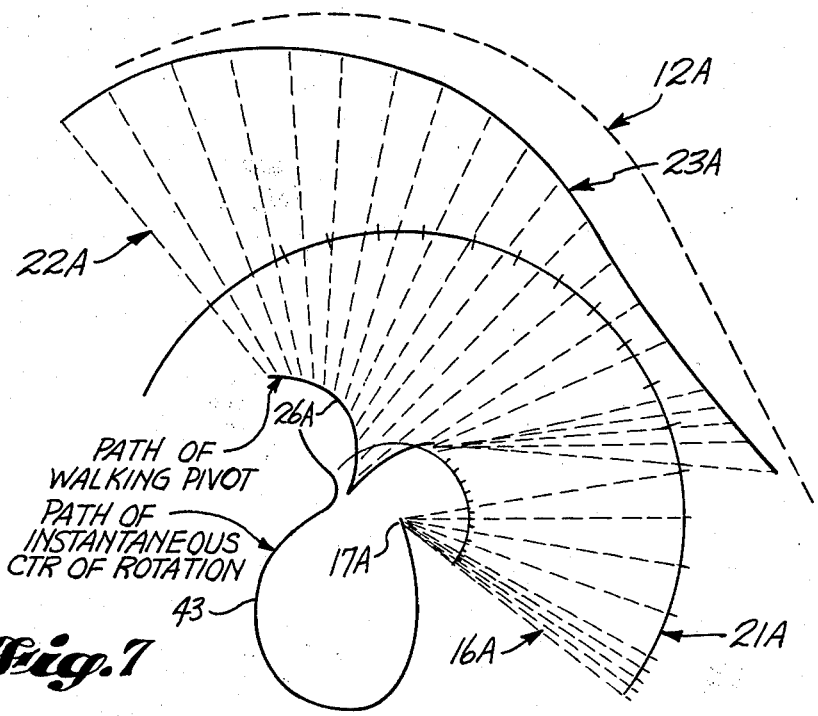
FIG. 7 is a plot of the instantaneous center-of-rotation of the door and its hinging mechanism.

FIG. 7 is a plotted kinematic layout describing the action of the door and is utilized in designing the cam action and the geometric linkage arrangement of the door. The dashed line 12A traces the motion of the top edge of the door 12 and the adjacent solid line 23A traces the motion of the pivotal connection 23 between the link 22 and the door 12. The motion of links 16 and 22 is indicated by the radial lines 16A and 22A respectively. With respect to the motion of link 22 as depicted by the radial lines 22A, it will be noted that the motion of the walking pivot 26 is plotted by the trace 26A which is a duplicate of the camtrack profile 30 in FIG. 6. In FIG. 7 the extensions of the radial lines 16A and 22A, plot a trace of the instantaneous center-of-rotation 43 of the door hinge mechanism. By profiling the plot of the instantaneous center-of-rotation of the door, i.e., by keeping this plot clustered in an area as small as possible, a more natural single pivot hinge feeling is produced during opening movement of the door. If the plot of the instantaneous center-of-rotation is spread out more to cover an area larger than that shown in FIG. 7, then there is a good possibility that at some point in the operating cycle of the door that it would rack-up. Therefore, by proper profiling of the cam tracks 28 and 30, the instantaneous center-of-rotation can be kept clustered fairly close together as shown and this will eliminate the possibility of racking as the door is moved to a desired position.

While the invention has been disclosed with reference to a preferred embodiment, it is to be understood that those modifications and changes which become obvious to a person skilled in the art to which this invention pertains, as a result of the teaching hereof, are considered to be encompassed by the following claims.

I claim:

1. A dual-cam guided four-bar linkage mechanism for profiling the hinging operation of a door from an extended closed position to a retracted open position, comprising: a first link fixedly fastened along the door surface; a second link pivotally connected at one end to one end of said first link and having a pivot at the other end fixed to door support structure; a third link pivotally connected at one end to the other end of said first link; a bellcrank pivotally mounted on said second link at a point intermediate the ends thereof and having a first arm forming a fourth link of said four-bar linkage, and said first arm being pivotally connected to the other end of said third link; a first camtrack fixed to door support structure and operatively engaged by a first cam follower mounted to the pivotal connection between said third link and said first arm of said bellcrank; a second camtrack positioned adjacent to said first camtrack and being fixedly mounted to door support structure; said second camtrack being operatively engaged by a second cam follower mounted to a second arm of said bellcrank; said bellcrank interacting between said first and second camtracks for profiling the hinging operation of the door from an extended open position through approximately a right-angular rotation in combination with a translational movement to a retracted open position.

2. The door hinging mechanism as set forth in claim 1, further including: a latch for retaining the door in the closed position; and an energizing device mounted between fixed support structure and said four-bar linkage for actuating the door to the retracted position upon release of said latch.

3. A dual-cam guided four-bar linkage mechanism for hinging a door of an overhead baggage stowage compartment in an airplane passenger section, said mechanism comprising: a first link forming a support bracket fixedly fastened to the door; a second link having a fixed pivot at one end and being pivotally connected at the other end to one end of said first link; a third link pivotally connected at one end to the other end of said first link; a fourth link formed by a first arm of a bellcrank which is pivotally mounted on said second link at a point intermediate the ends thereof and said first arm being pivotally connected to the other end of said third link; a first camtrack fixed to structure and operatively engaged by a first cam follower mounted to the pivotal connection between said third link and said first arm of said bellcrank; a second camtrack fixed to structure adjacent to said first camtrack and operatively engaged by a second cam follower mounted to a second arm of said bellcrank; said bellcrank interacting between said first and second camtracks for profiling operation of the door through approximately a right-angular rotation in combination with translational movement through a narrow horizontal aperature above said stowage compartment.

4. The door hinging mechanism as set forth in claim 3, further including: a latch for retaining the door in the closed position; and an energizing device mounted between fixed support structure and said four-bar linkage for actuating the door to the retracted position upon release of said latch.

* * * * *